G. W. CRABTREE.
SHOCK ABSORBER.
APPLICATION FILED JAN. 6, 1917.
1,323,839.
Patented Dec. 2, 1919.
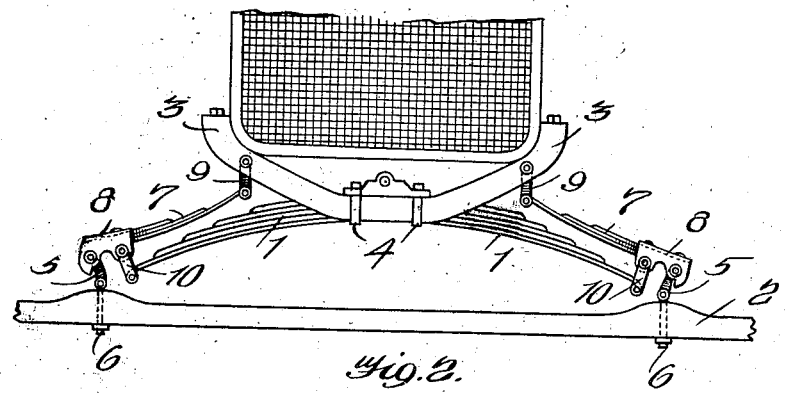
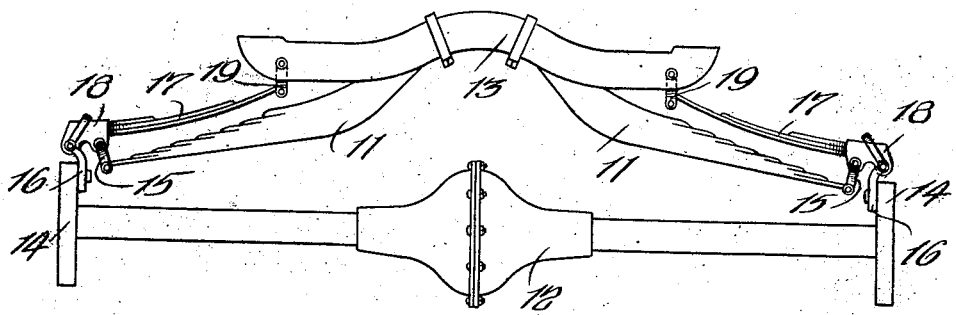
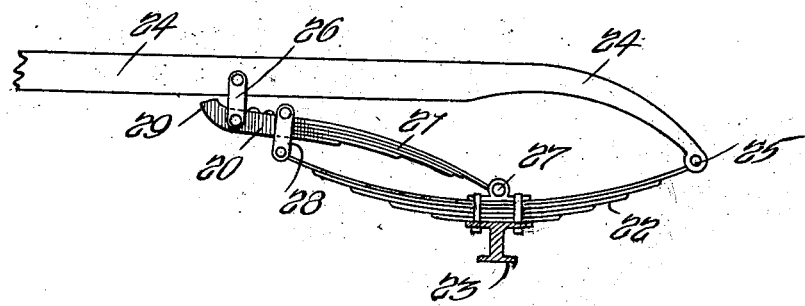
WITNESSES
INVENTOR
GEORGE W. CRABTREE,
BY
ATTORNEYS

UNITED STATES PATENT OFFICE.

GEORGE WELLINGTON CRABTREE, OF ARDMORE, OKLAHOMA.

SHOCK-ABSORBER.

1,323,839.   Specification of Letters Patent.   Patented Dec. 2, 1919.

Application filed January 6, 1917. Serial No. 140,969.

*To all whom it may concern:*

Be it known that I, GEORGE W. CRABTREE, a citizen of the United States, and a resident of Ardmore, in the county of Carter and State of Oklahoma, have invented an Improvement in Shock-Absorbers, of which the following is a specification.

My invention is an improvement in shock absorbers, and has for its object to provide means for use in connection with the springs of motor vehicles for assisting in the absorption and elimination of road shocks and jars, and for absorbing the jar caused by the rebound of the springs, and for preventing the breaking of the springs.

In the drawings:

Figure 1 is a partial front view of a motor vehicle showing the arrangement at the front spring.

Fig. 2 is a similar view at the rear of the vehicle showing the arrangement at the rear springs.

Fig. 3 is a partial side view of another arrangement.

In Fig. 1 the shock absorber is shown in connection with the front spring 1 of a motor vehicle, the said spring being arranged between the axle 2 and the channel-shaped spring hanger 3, the center of the spring being received in the hanger and being clamped thereto by the clips 4 in the usual manner.

In the usual type of motor vehicle, as for instance the Ford, the ends of the spring 1 are connected to the axle by hangers 5, the said hangers being connected to the axle as indicated at 6 at one end, and to the ends of the spring at the other. To apply the improved shock absorbers these hangers 5 are released from the ends of the springs, and turned up into the position of Fig. 1. Each of the improved shock absorbers consists of a laminated spring 7 and a channel member 8 within which the large end of the spring is received and secured. These springs 7 are of approximately half the length of the spring 1, and each spring at its inner small end is connected to the channel hanger 3, for the spring 1, by a hanger 9.

Each of the hangers 5 before-mentioned is pivotally connected to the adjacent bracket 8, at its outer end, and each bracket is connected at its inner end to the adjacent end of the spring 1 by a hanger 10. The only change necessary in the motor vehicle itself in order to apply the improved shock absorbers is the provision of openings in the channel hanger 3 for engagement by the double-link hangers 9.

In Fig. 2 the improvement is shown at the rear spring 11, the said spring being arranged between the rear axle housing 12 and the rear channel hanger 13. In the usual construction the outer ends of the spring 11 are connected to the frame indicated at 14. The hangers 15 which connect the ends of the spring to the frame are released from the frame, and brackets 16 are connected to the frame at the opposite ends of the spring, replacing those elements to which the hangers 15 were originally connected. The shock absorbers are similar to those shown in Fig. 1, each comprising a laminated spring 17 and a channel bracket 18 to which the large end of the spring is connected. The inner end of each spring is connected to the hanger 13 by a hanger 19, and the outer end is connected to the bracket 16 before mentioned, that is the channel bracket 18 is so connected. Each hanger 15 is connected with the adjacent bracket, and the only change necessitated at this point is the attachment of the bracket 16, and the provision of the openings in the channel hanger.

In Fig. 3 the shock absorber, consisting of the bracket 20 and the laminated spring 21, is shown in connection with a semi-elliptical spring 22. This spring is secured intermediate its ends to the axle 23, and one end is connected to the frame 24 as indicated at 25. The bracket 20 of the shock absorber is connected to the frame near the inner end of the spring 22 by means of a hanger 26, and the small end of the spring is connected to the spring 22, at its center, as indicated at 27. The inner end of the spring 22 is connected to the shock absorber near the hanger 26 by means of a hanger 28. It will be noticed from an inspection of Fig. 3 that the inner end of the bracket 20 is curved upward as indicated at 29 to provide an abutment or buffer for engaging the frame to limit the downward swinging of the outer or small end of the shock absorber.

I claim:

1. A shock absorber for a motor vehicle, comprising a pair of auxiliary springs for each of the main springs of the vehicle, the auxiliary springs being connected to the body, the axle and the main spring of the vehicle, each auxiliary spring having at its outer end a channel shaped bracket, each bracket having a hanger engaging the adjacent end of the main spring, and having a pivotal connection with the axle, and a hanger swingingly connecting the inner end of the auxiliary spring with the body of the vehicle.

2. A spring suspension for automobiles comprising, in combination with the vehicle body and principal leaf spring and the axle assembly, a lever pivoted to the axle assembly, a non-resilient connection between the lever and the automobile body, and a connection between an end of the principal leaf spring and the lever.

3. The combination with a spring suspension for automobiles embodying a principal leaf spring, an axle assembly, a lever pivoted to the axle assembly, and a connection between the lever and end of the spring, of a non-resilient connection between the inner end of the lever and the automobile body.

GEORGE WELLINGTON CRABTREE.